(12) United States Patent
Liu et al.

(10) Patent No.: US 7,968,248 B2
(45) Date of Patent: Jun. 28, 2011

(54) LIQUID-LIQUID FUEL CELL SYSTEMS HAVING FLOW-THROUGH ANODES AND FLOW-BY CATHODES

(76) Inventors: Junli Liu, Bothell, WA (US); Lorne Roy, Seattle, WA (US); David Wine, Seattle, WA (US); Leroy Ohlsen, Gold Bar, WA (US); Jonathan Mallari, Seattle, WA (US); Art Homa, Kirkland, WA (US)

( * ) Notice: Subject to any disclaimer, the term of this patent is extended or adjusted under 35 U.S.C. 154(b) by 1184 days.

(21) Appl. No.: 11/669,895

(22) Filed: Jan. 31, 2007

(65) Prior Publication Data

US 2009/0023036 A1   Jan. 22, 2009

(51) Int. Cl.
*H01M 8/04* (2006.01)
*H01M 2/14* (2006.01)
*H01M 8/00* (2006.01)

(52) U.S. Cl. .................. 429/513; 429/512; 429/515

(58) Field of Classification Search .......... 429/12–46
See application file for complete search history.

(56) References Cited

U.S. PATENT DOCUMENTS

| | | | |
|---|---|---|---|
| 3,261,717 A | 7/1966 | Shropshire et al. | |
| 3,281,274 A | 10/1966 | Moerikofer | |
| 3,318,735 A | 5/1967 | Tarmy et al. | |
| 3,350,227 A | 10/1967 | Moerikofer et al. | |
| 3,979,225 A | 9/1976 | Smith et al. | |
| 4,528,250 A | 7/1985 | Struthers | |
| 5,364,711 A | 11/1994 | Yamada et al. | |
| 5,523,177 A | 6/1996 | Kosek et al. | |
| 5,559,638 A | 9/1996 | Aoki et al. | |
| 5,773,162 A | 6/1998 | Surampudi et al. | |
| 5,874,182 A | 2/1999 | Wilkinson et al. | |
| 5,945,231 A | 8/1999 | Narayanan et al. | |
| 5,992,008 A | 11/1999 | Kindler | |
| 6,387,559 B1 | 5/2002 | Koripella | |
| 6,713,206 B2 | 3/2004 | Markoski et al. | |
| 2002/0182479 A1 | 12/2002 | Mallari | |
| 2003/0194598 A1 | 10/2003 | Chan | |
| 2005/0084737 A1* | 4/2005 | Wine et al. ............... | 429/38 |
| 2005/0089748 A1* | 4/2005 | Ohlsen et al. ............ | 429/44 |

FOREIGN PATENT DOCUMENTS

| | | |
|---|---|---|
| WO | 0137357 | 5/2001 |
| WO | 02086994 | 10/2002 |
| WO | 03058734 | 7/2003 |

* cited by examiner

*Primary Examiner* — Dah-Wei D Yuan
*Assistant Examiner* — Steven Scully
(74) *Attorney, Agent, or Firm* — Tue Nguyen

(57) ABSTRACT

The invention disclosed herein relates to fuel cell electrode pair assemblies, not having interposing proton exchange membranes, configured to receive and react with liquid anolyte and liquid catholyte microfluidic flowstreams. In one embodiment, the present invention is directed to a fuel cell electrode pair assembly, not having an interposing proton exchange membrane, configured to receive and react with a liquid microfluidic anolyte flowstream (e.g., laminarly flowing methanol solution) and a liquid microfluidic catholyte flowstream (e.g., laminarly flowing nitric acid solution), wherein the fuel cell electrode pair assembly comprises: a porous flow-through anode; a porous flow-by cathode confronting and spaced apart from the anode; and a central plenum interposed between and connected to the anode and the cathode.

34 Claims, 3 Drawing Sheets

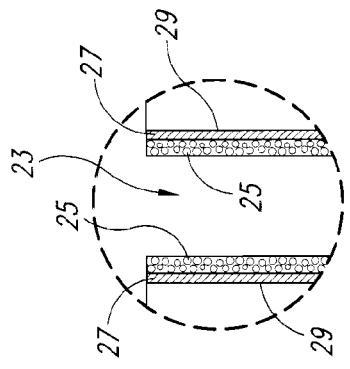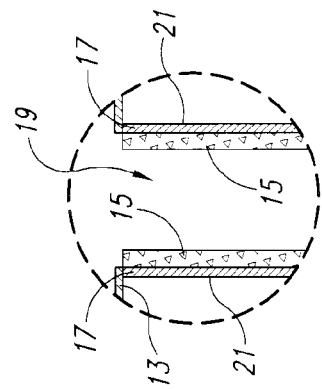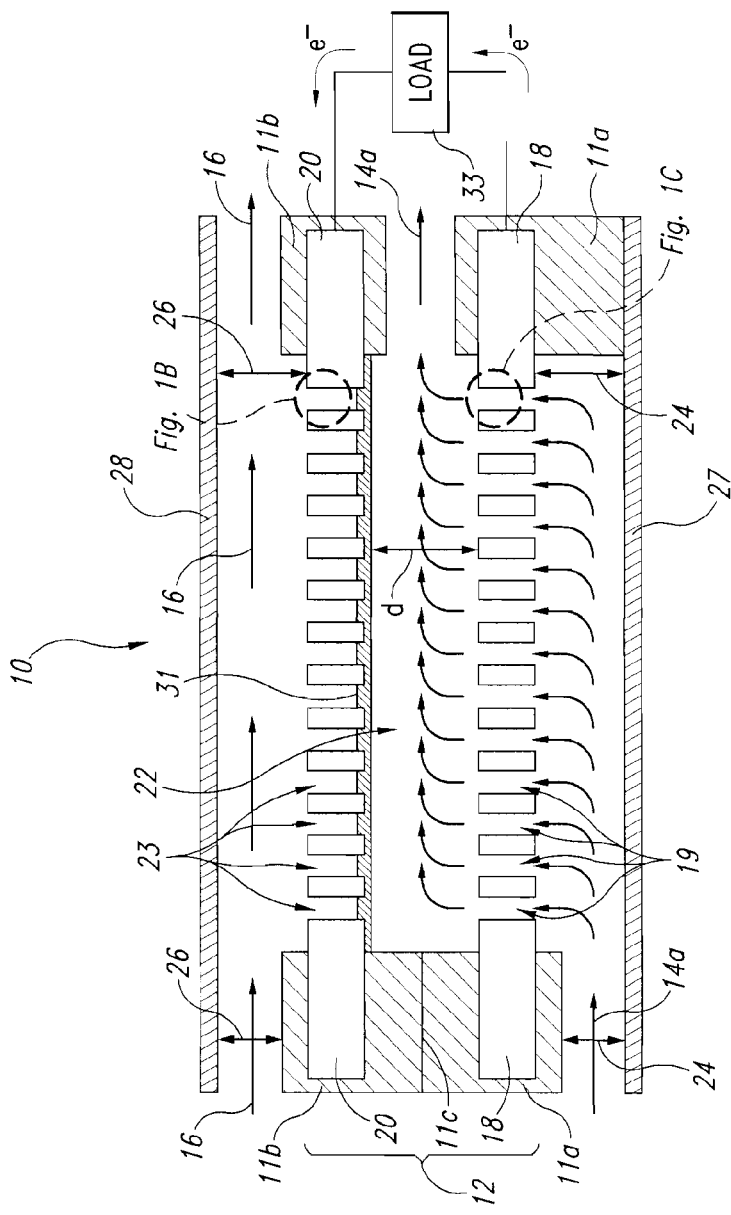

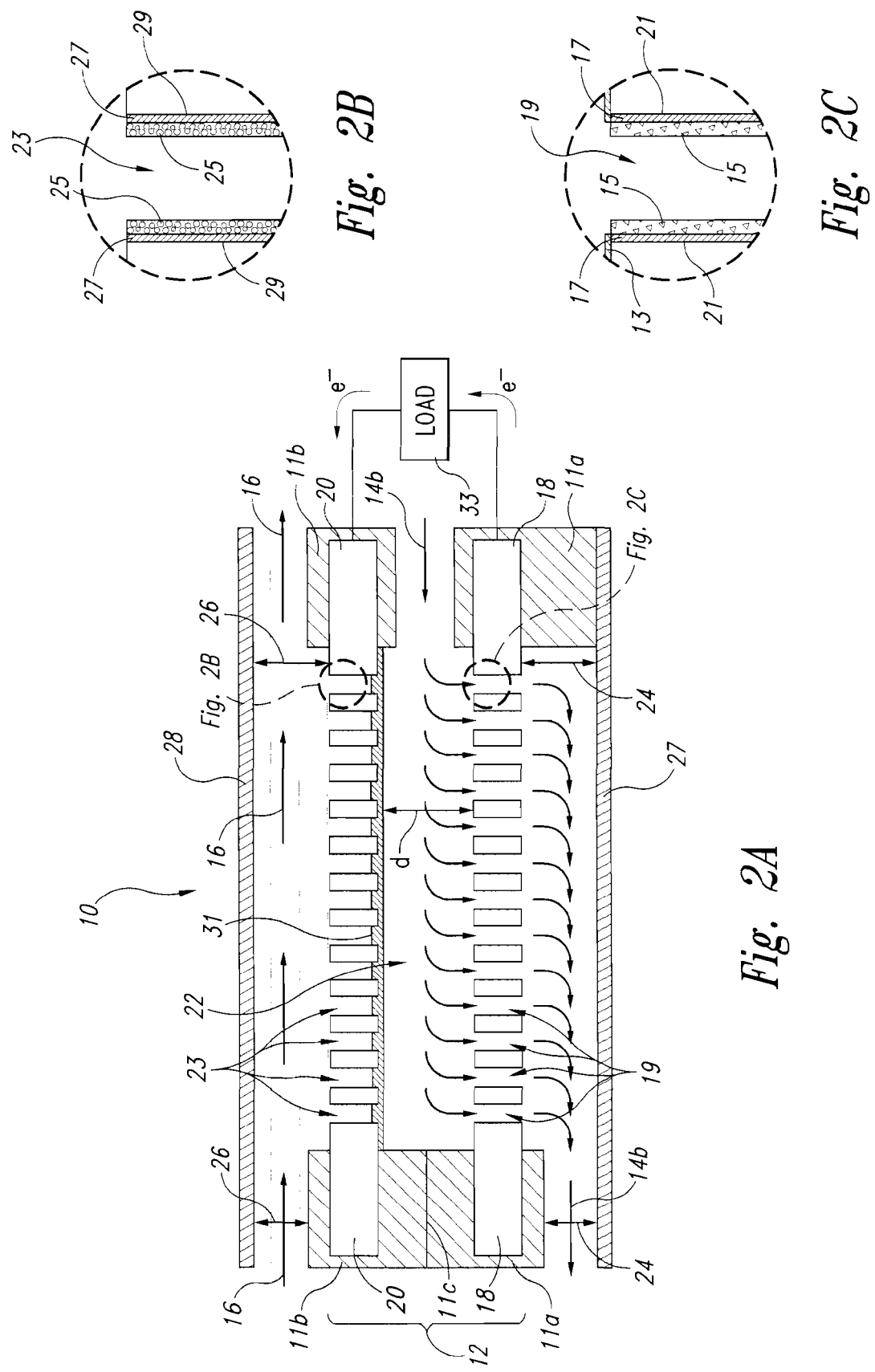

LIQUID-LIQUID FUEL CELL SYSTEMS HAVING FLOW-THROUGH ANODES AND FLOW-BY CATHODES

GOVERNMENT RIGHTS

This invention was made with United States Government support under Advanced Technology Program Award Number 70NANB3H3036 awarded by the National Institute of Standards and Technology (NIST). The United States Government has certain rights in the invention.

TECHNICAL FIELD

The present invention relates generally to fuel cell systems and, more specifically, to microfluidic fuel cell systems that include at least one stack assembly having electrode pair assemblies configured to receive and react with liquid anolyte and liquid catholyte flowstreams.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied from an external reactant supply source. Fuel cells operate by converting a reactant fuel such as hydrogen or a hydrocarbon (e.g., methanol) to electrical power through an electrochemical process rather than by combustion. It does so by harnessing the electrons released from controlled oxidation-reduction reactions occurring on the surface of a catalyst. A fuel cell can produce electricity continuously so long as proper reactants (i.e., a fuel and an oxidant) are supplied from an outside source.

As is appreciated by those skilled in the art, most conventional micro-scale fuel cell systems include a stack of electrically interconnected electrode pair assemblies (commonly referred to as a fuel cell stack assembly), wherein each electrode pair is configured to receive and react with selected reactants (e.g., methanol and air flowstreams delivered across respective outer electrode surfaces). The interposing electrolyte of most conventional micro-scale liquid-air fuel cell systems (e.g., direct methanol fuel cell (DMFC) systems) generally consist of a solid polymer proton exchange membrane (PEM) (e.g., NAFION). Electrode pair assemblies that include solid polymer proton exchange membranes (sometimes referred to as solid polymer electrolytes (SPEs)) are known as membrane electrode assemblies (MEAs). Exemplary in this regard are the MEAs and micro-scale methanol-air fuel cell systems disclosed in U.S. Pat. No. 5,364,711 to Yamada et al., U.S. Pat. No. 5,523,177 to Kosek et al., U.S. Pat. No. 5,559,638 to Aoki et al., U.S. Pat. No. 5,773,162 to Surampudi et al., U.S. Pat. No. 5,874,182 to Wilkerson et al., U.S. Pat. No. 5,945,231 to Narayanan et al., U.S. Pat. No. 5,992,008 to Kindler, and U.S. Pat. No. 6,387,559 to Koripella. These known micro-scale fuel cell systems all comprise an interconnected series of electrode pair assemblies, wherein each electrode pair utilizes a solid polymer proton exchange membrane as a separator and as a proton (H+) transfer medium. As is appreciated by those skilled in the art, a solid polymer proton exchange membrane refers to a perfluorosulfonic acid membrane such as, for example, NAFION (E.I. Du Pont de Nemours and Company, U.S.A.). In general, many of these ionomer membranes comprise a polytetrafluoroethylene (PTFE) polymer backbone chain that is several units (e.g., n=6-10) in length, with a flexible perfluorinated vinyl polyether (m≧1) pendant branch, wherein the pendant branch has a terminal acidic (sulfonic) group to provide for cation (proton) exchange capability. As an example, such an ionomer unit may have the following structure (equivalent weight of about 1,200):

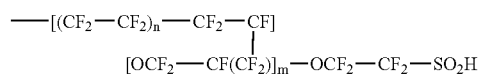

There are, however, significant technical problems associated with known micro-scale PEM-based methanol-air fuel cell systems. More specifically, and because these type of systems employ a central PEM, conventional micro-scale methanol-air fuel cell systems suffer from several drawbacks including: (1) each electrode possesses only a limited two-dimensional catalyzed reaction zone, wherein each zone is defined by the interface between the reactant flowstream and one of the catalyzed outer surfaces of the central PEM, (2) the central PEM tends to degrade rapidly over time if not sufficiently and continuously hydrated, and (3) unreacted fuel is able to "cross-over" from the anode compartment to the cathode compartment via the central PEM and degrade the cathode-side catalyst. These drawbacks are generally inherent to most all types of conventional PEM-based methanol-air fuel cell systems even though numerous solutions have been contemplated.

In contrast, certain liquid-liquid fuel cell systems avoid many of the drawbacks associated with PEM-based methanol-air fuel cell systems because these types of systems do not utilize a central PEM. In general, liquid-liquid fuel cell systems typically comprise electrode pairs and related stack assemblies that include a series of microfluidic flow channels for flowing liquid reactant/electrolyte flowstreams (i.e., electrolytic fuel and oxidant flowstreams referred to herein as anolyte and catholyte flowstreams, respectively) adjacent to and/or through discrete regions of accompanying porous electrode structures. Exemplary in this regard are the liquid-liquid fuel cell systems disclosed in U.S. Pat. No. 3,261,717 to Shropshire et al., U.S. Pat. No. 3,281,274 to Moerikofer, U.S. Pat. No. 3,318,735 to Tammy et al., U.S. Pat. No. 3,350,227 to Moerikofer et al., U.S. Pat. No. 3,979,225 to Smith et al., U.S. Pat. No. 4,528,250 to Struthers, and U.S. Pat. No. 6,713,206 to Markoski et al. Most all of these known fuel cell systems use nitric acid as the primary oxidant (wherein the nitric acid may be continuously regenerated by intimate exposure to oxygen gas supplied from the air) and methanol or other like hydrocarbon as the fuel. These known fuel cell systems, however, have significant technical limitations and are not optimal for generating power within a closed recirculating microfluidic liquid-liquid feed system adapted for use with a portable electronic device.

Accordingly, there is still a need in the art for new types of microscale liquid-liquid fuel cell systems. The present invention fulfills these needs and provides for further related advantages.

SUMMARY OF THE INVENTION

In brief, the present invention relates generally to fuel cell systems and, more specifically, to fuel cell electrode pair assemblies, not having interposing proton exchange membranes, configured to receive and react with liquid anolyte and liquid catholyte microfluidic flowstreams. In one embodiment, the present invention is directed to a fuel cell electrode pair assembly, not having an interposing proton exchange membrane, configured to receive and react with a liquid microfluidic anolyte flowstream (e.g., a laminarly flowing methanol/sulfuric acid solution) and a liquid microfluidic catholyte flowstream (e.g., a laminarly flowing nitric acid/sulfuric acid solution), wherein the fuel cell electrode pair assembly comprises: a porous flow-through anode; a porous flow-by cathode confronting and spaced apart from the anode; and a central plenum interposed between and connected to the anode and the cathode. In this embodiment, the anolyte flowstream functions as an electrolyte and is configured to flowingly contact and substantially pass through the anode and into or out of the central plenum, and wherein the catholyte flowstream is configured to flowingly contact and pass adjacent to the cathode such that a nonflowing portion of the catholyte flowstream penetrates into the cathode but does not substantially pass through the cathode and into the central plenum.

These and other aspects of the present invention will become more evident upon reference to the following detailed description and attached drawings. It is to be understood, however, that various changes, alterations, and substitutions may be made to the specific embodiments disclosed herein without departing from their essential spirit and scope. In addition, it is expressly provided that all of the various references cited herein are incorporated herein by reference in their entireties for all purposes.

BRIEF DESCRIPTION OF THE DRAWINGS

The drawings are intended to be illustrative and symbolic representations of certain exemplary embodiments of the present invention and as such, they are not necessarily drawn to scale. Like reference numerals are used to designate like features throughout the several views of the drawings.

FIG. 1A depicts a side cross sectional view of an electrode pair assembly in accordance with an embodiment of the present invention. As shown, a liquid anolyte flowstream is configured to flowingly contact and substantially pass through a porous flow-through anode and into a central plenum, whereas a liquid catholyte flowstream is configured to flowingly contact and pass adjacent to a porous flow-by cathode such that a portion of the catholyte flowstream reacts at the cathode but does not substantially pass through the cathode and into the central plenum.

FIG. 1B shows an enlarged view of a circled portion of the porous flow-through anode of FIG. 1A, wherein the circled portion illustrates a single pore having a first selected catalyst layer positioned on an interposing first selected conductive layer that, in turn, is positioned on the anode pore wall.

FIG. 1C shows an enlarged view of a circled portion of the porous flow-by cathode of FIG. 1A, wherein the circled portion illustrates a single pore having a second selected catalyst layer positioned on a first substrate and on an interposing second selected conductive layer that, in turn, is positioned on the cathode pore wall.

FIG. 2A depicts a side cross sectional view of an electrode pair assembly in accordance with a second embodiment of the present invention. As shown, a liquid anolyte flowstream is configured to flow out of a central plenum and flowingly contact and substantially pass through a porous flow-through anode, whereas a liquid catholyte flowstream is configured to flowingly contact and pass adjacent to a porous flow-by cathode such that a portion of the catholyte flowstream reacts at the cathode but does not substantially pass through the cathode and into the central plenum.

FIG. 2B shows an enlarged view of a circled portion of the porous flow-through anode of FIG. 1A, wherein the circled portion illustrates a single pore having a first selected catalyst layer positioned on an interposing first selected conductive layer that, in turn, is positioned on the anode pore wall.

FIG. 2C shows an enlarged view of a circled portion of the porous flow-by cathode of FIG. 1A, wherein the circled portion illustrates a single pore having a second selected catalyst layer positioned on a second substrate and on an interposing second selected conductive layer that, in turn, is positioned on the cathode pore wall.

DETAILED DESCRIPTION OF THE INVENTION

Figure 3:
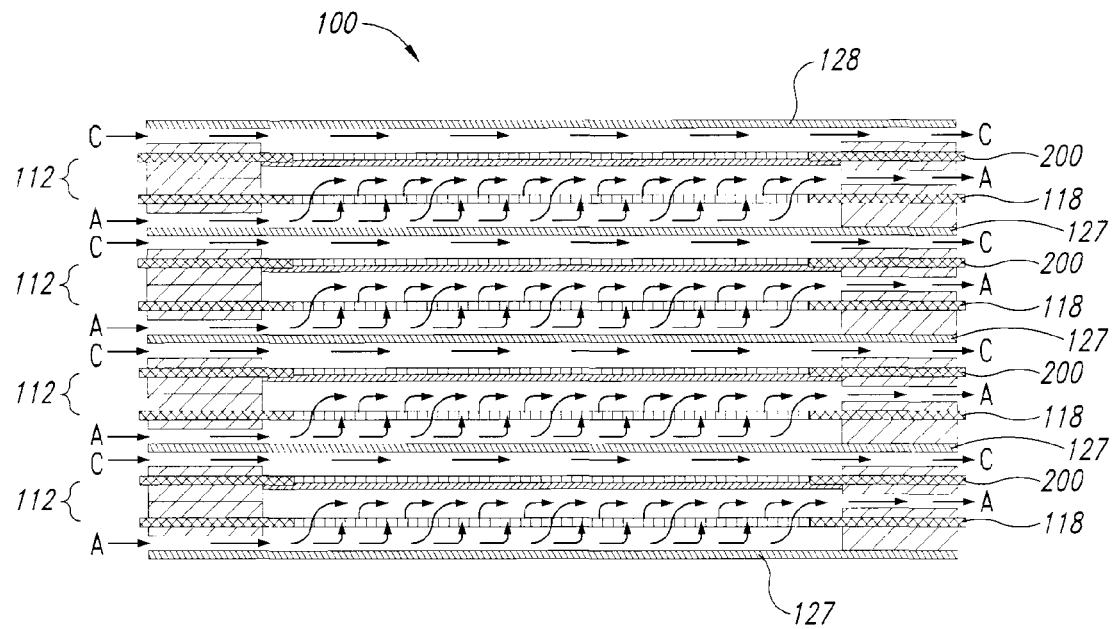
FIG. 3 depicts a side cross sectional view of a four cell stack assembly in accordance with an embodiment of the present invention, wherein the electrode pairs are arranged in an anode-cathode/anode-cathode/anode-cathode/anode-cathode configuration, and wherein discrete anolyte flowstreams supply each anode and discrete catholyte flowstreams supply each cathode.

The present invention is directed to novel fuel cell systems that react liquid anolyte and liquid catholyte flowstreams in separate electrochemical half-cell reactions. For purposes of illustration and not limitation, the present invention is described herein in the context of various methanol-nitric acid fuel cell systems; however, those skilled in the art will appreciate that other fuel cell systems having other liquid fuel-liquid oxidant combinations are possible and within the scope of the present invention. The fuel cell systems of the present invention, unlike conventional PEM-based fuel cell systems, comprise novel electrode pair assemblies that do not include an interposing solid polymer proton exchange membrane. Rather, the liquid anolyte flowstream (having an acidic electrolyte component) functions as the interposing electrolyte. In this configuration, protons liberated at the anode are able to migrate through the interposing flowing liquid anolyte flowstream (contained within a central plenum) and combine with oxidant at the opposing cathode to yield reaction products.

More specifically, and with reference to FIGS. 1A-C and FIGS. 2A-C (representing near identical first and second embodiments, respectively), the present invention is directed to a methanol-nitric acid fuel cell system 10 that includes an electrode pair assembly 12, not having an interposing solid polymer proton exchange membrane, configured to receive and react with a liquid methanol anolyte flowstream 14A, 14B and a liquid nitric acid catholyte flowstream 16. As shown, the anolyte flowstream 14A of FIG. 1A is flowing in a first direction, while the anolyte flowstream 14B of FIG. 1B is flowing in a second opposite direction—otherwise, the first and second embodiments (and their respective drawings) are the same. Thus, and as best shown in FIG. 1A and FIG. 2A, the fuel cell electrode pair assembly 12 of the present invention includes a porous flow-through anode 18, a porous flow-by cathode 20 confronting and spaced apart from the anode 18 (generally a distance d that is between about 250 µm to about 1 mm), and a central plenum 22 that is interposed between and connected to the anode 18 and the cathode 20. The anode 18 and the cathode 20 are each generally encased within respective non-conductive housings 11a, 11b that, in turn, are bonded or welded together at their interface 11c to form the electrode pair assembly 12. The non-conductive housings 11a, 11b may be formed of plastic such as, for example, a polycarbonate or a polyvinylidene (PVDF), or a glass material. In addition, the non-conductive housings 11a, 11b may be bonded together with a suitable adhesive or a welded together with a laser as is appreciated by those skilled in the art.

As further shown, the porous flow-through anode 18 (generally having a uniform thickness ranging from about 100 µm to about 500 µm) includes a plurality of spaced apart flow-through anode pores 19 each having a first selected catalyst layer 15 (shown in FIGS. 1C and 2C respectively) positioned on an interposing first selected conductive layer 17. The flow-through anode pores 19 extend through the flow-through anode 18 and may be regularly spaced apart from one another a distance ranging from about 3 µm to about 20 µm. Accordingly, the flow-through anode pores 19 generally have aspect ratios of greater than about 10:1. The first selected conductive layer 17 generally has a uniform thickness ranging from about 50 Å to about 2,500 Å and is positioned on the anode pore walls 21, as well as on the inner surface 13 and outer surface (not shown) of the anode 18. The first selected catalyst layer 15 preferably comprises a plurality of surface adhered platinum:ruthenium ($Pt_x$:$Pt_y$) particles, whereas the first selected conductive layer 17 preferably comprises a conductive metallic material such as, for example, gold, ruthenium, or nickel silicide and is generally conformal (i.e., uniform step-wise coverage) to the underlying surface defined by the anode pore walls 21. The first selected conductive layer 17 functions, in part, as a current collector for the flow-through anode 18. An optional seed layer (not shown) of, for example TiW/Au, may be interposed between the first conductive layer 17 and the anode pore walls 21 and the inner surface 13 and the outer surface (not shown) of the anode 18.

As further shown, the liquid methanol anolyte flowstream 14A, 14B is configured to flowingly contact and pass through the porous flow-through anode 18 (via the plurality of flow-through pores 19) and into (as shown in FIG. 1A) or out of (as shown in FIG. 2A) the central plenum 22. A first reactant, namely methanol or other reactive hydrocarbon, contained within the anolyte flowstream 14A, 14B (e.g., methanol in an aqueous electrolyte solution) is thus able to react at the first selected catalyst layer 15 so as to liberate protons ($H^+$) and electrons ($e^-$). The anolyte flowstream 14A, 14B generally has a flow rate ranging from about 0.3 ml/min to about 1.8 ml/min.

Similar to the porous flow-through anode 18, the porous flow-by cathode 20 (also generally having a uniform thickness ranging from about 100 µm to about 500 µm) also includes a plurality of spaced apart cathode pores 23 each having a second catalyst layer 25 (shown in FIGS. 1B and 2B respectively) positioned on an interposing second selected conductive layer 27. The cathode pores 23 similarly extend through the flow-by cathode 20 and may be regularly spaced apart from one another a distance ranging from about 3 µm to about 20 µm. Accordingly, the cathode pores 23 also generally have aspect ratios of greater than about 10:1. The second selected conductive layer 27 generally has a uniform thickness ranging from about 50 Å to about 2,500 Å and is positioned on the cathode pore walls 29. The second selected catalyst layer 25 preferably comprises a plurality of surface adhered gold, platinum, ruthenium, or palladium particles. Similarly, the second selected conductive layer 27 preferably comprises a conductive metal such as, for example, gold, platinum, ruthenium, or palladium, and is also generally conformal to the underlying surface defined by the cathode pore walls 29 and likewise functions, in part, as a current collector for the cathode 20. The second catalyst layer 25 and the second selected conductive layer 27 are in some embodiments the same material. The otherwise flow-through cathode pores 23 of the cathode 20 are plugged by a catalyzed separation layer 31 adhered to the cathode 20 on the side facing the plenum 22 as shown. The catalyzed separation layer 31 prevents the catholyte flowstream 16 from substantially passing through the flow-by cathode 20 and into the central plenum 22.

In contrast to the liquid methanol anolyte flowstream 14A, 14B, the liquid nitric acid catholyte flowstream 16 is configured to flowingly contact and pass adjacent to the porous flow-by cathode 20 such that a portion of the catholyte flowstream 16 reacts at the cathode 20 but does not substantially pass through the cathode 20 and into the central plenum 22. More specifically, the catalyzed separation layer 31 substantially prevents the catholyte flowstream 16 from passing into the plenum 22 by acting as a physical barrier for fluid transport. In some embodiments, the catalyzed separation layer 31 is a porous interconnected network of catalyst particles embedded within a polymeric binder material. For example, the catalyzed separation layer 31 may be applied (e.g., painted) onto the cathode 20 as a polymer-based ink coating that contains a major amount of platinum nanoparticles.

Because of the presence of the catalyzed separation layer 31 on the cathode 20, a second reactant, namely nitric acid, contained within the catholyte flowstream 16 (e.g., nitric acid in an aqueous electrolyte solution) is able to react at the second selected catalyst layer 25 and accept protons ($H^+$) and electrons ($e^-$) without substantially passing through the cathode 20 and into the central plenum 22. An external load 33 completes the circuit and establishes a pathway for free electrons ($e^-$) to travel from the anode 18 to the cathode 20. The protons ($H^+$) liberated at the porous flow-through anode 18 travel across the liquid methanol anolyte flowstream 14A, 14B contained within the central plenum 22 and migrate through the catalyzed separation layer 31 in order to reach and react at the porous flow-by cathode 20 (namely, at the second selected catalyst layer 25 of the plurality of flow-through cathode pores 23). In alternative embodiments (not shown), the catalyzed separation layer 31 is adhered to the side of the cathode 20 facing the catholyte flowstream 16 so as to plug (partially, substantially, or completely) the plurality of flow-through pores 23.

As further shown, the fuel cell system 10 of the present invention also includes (1) an anolyte flow channel 24 positioned adjacent to the anode 18 and to a first wall 27 (e.g., plastic) for transporting the liquid anolyte flowstream 14A, 14B to the anode 18 by means of an upstream or downstream pump (not shown), and (2) a catholyte flow channel 26 positioned adjacent to the cathode 20 and to a second wall 28 (e.g., plastic) for transporting the liquid catholyte flowstream 16 to the cathode 20 also by means of an upstream or downstream pump (not shown). Unlike conventional direct fuel cell systems that utilize solid polymer proton exchange membranes as the interposing electrolyte (of an electrode pair assembly), the electrode pair assemblies 12 of the different embodiments of the present invention utilize the liquid anolyte flowstream 14A, 14B (having an acidic electrolyte component (e.g., $H_2SO_4$ or triflic acid)) as the interposing electrolyte. In this way, protons ($H^+$) liberated at the anode 18 are able to migrate through the interposing flowing liquid anolyte flowstream 14A, 14B (contained within the central plenum 22) and combine with oxidant at the catalyst layer 25 of the opposing cathode 20 to yield reaction products. In the context of a direct methanol-nitric acid fuel cell system and in accordance with certain embodiments of the present invention, the electrochemical reactions occurring are believed to be essentially as follows:

Anode: $CH_3OH+H_2O \rightarrow 6H^+ + 6e^- + CO_2$ (1)

Cathode: $2HNO_3 + 6H^+ + 6e^- \rightarrow 2NO + 4H_2O$ (2)

Net: $CH_3OH + 2HNO_3 \rightarrow 2NO + 3H_2O + CO_2$ (3)

The dimensions of the electrode pair assemblies 12, central plenums 22, and anolyte/catholyte flow channels 24, 26 (delivery and removal) of the present invention are generally configured such that the inventive fuel cell system 10 is considered to be a microfluidic device, meaning that fluid flow is characterized by a low Reynolds number (i.e., Re<~2,000). Thus, and as used herein, the term "microfluidic" simply refers to an article of manufacture that has one or more flow channels or plenums with at least one dimension less than about 1 millimeter (mm). As is appreciated by those skilled in the art, the Reynolds number ($R_e$) characterizes the tendency of a flowing liquid phase to develop turbulence and may be expressed by the following Equation (4):

$$Re = Vd\rho/\mu \quad (4)$$

where V is the average linear flow rate (m/s), d is the diameter of the "pipe" (m), $\rho$ is the density of the fluid (kg/m$^3$), and $\mu$ is the absolute viscosity of the fluid (Ns/m$^2$). In the context of a flow channel or plenum having a rectangular cross section in accordance with certain embodiments of the present invention, the pipe diameter is more appropriately replaced with the hydraulic diameter ($D_h$), which is given by four times the cross-sectional area divided by the perimeter of the flow channel or plenum (i.e., $D_h = 2wh/(w+h)$ where w and h are the width and height, respectively, of the flow channel or plenum). As used herein, the term "plenum" means a chamber or compartment such as the spaced apart region between the confronting electrodes disclosed herein, whereas the term "channel" means an enclosed elongated groove or furrow. Thus, the Reynolds number for fluid flow within a plenum or flow channel having a rectangular cross section (such as those of certain embodiments of the present invention) may more accurately be represented by Equation (5):

$$Re = VD_h\rho/\mu \quad (5)$$

In view of the foregoing, it is apparent that the lower the velocity (v) of the liquid flow, the diameter of the pipe or capillary (c), and the density of the liquid ($\rho$), and the higher the viscosity ($\mu$) of the liquid, the lower the Reynolds number. As is appreciated by those skilled in the art, laminar flow generally occurs in fluidic systems with Re<~2,000, and turbulent flow generally occurs in fluidic systems with Re>~2,000 (see, e.g., P. Kenis et al., Microfabrication Inside Capillaries Using Multiphase Laminar Flow Patterning, *Science* 285:83-85, 1999). Thus, typical widths and heights associated with the microfluidic plenums and flow channels of the present invention generally range from about 10 to about 10,000 μm, preferably from about 50 to about 5,000 μm, and even more preferably from about 100 to about 1,000 μm. In some preferred embodiments, the anode and cathode are confronting and spaced apart a distance of about 50 microns to about 1 millimeter (i.e., ~1 mm), and more preferably from about 100 microns to about 400 microns. In addition, typical Reynolds numbers associated with the internal laminar flowstreams of the present invention are generally less than 1,000, and more preferably between 10 and 100. Finally, the flow velocities associated with the internal laminar flowstreams of certain embodiments of the present invention generally range from about 2 μm/min to about 100 μm/min, and fluid fluxes (associated with certain flow-through electrode embodiments) generally range from about 10 μm/min/cm$^2$ to about 500 μm/min/cm$^2$.

In some embodiments, the anolyte flowstream 14A, 14B comprises a fuel selected from methanol, ethanol, propanol, or a combination thereof, and the catholyte flowstream 16 comprises an oxidant selected from oxygen, hydrogen peroxide, nitric acid, or a combination thereof. In addition, the electrolyte used in the anolyte and/or catholyte flowstreams preferably is an acid selected from phosphoric acid, sulfuric acid, trifluoromethane sulfonic acid (triflic acid), difluoromethane diphosphoric acid, difluoromethane disulfonic acid, trifluoroacetic acid, or a combination thereof. In some embodiments, the anolyte flowstream is an approximate 2M MeOH/4M $H_2SO_4$ liquid fuel/electrolyte mixture, and the catholyte flowstream is an approximate 2M $HNO_3$/4M $H_2SO_4$ liquid oxidant/electrolyte flowstream. The molarities of the different chemical constituents associated with the anolyte and catholyte flowstreams may, however, vary substantially from these exemplary values.

Because of the highly corrosive and reactive nature of the chemicals involved with the direct fuel cell systems disclosed herein, the various electrode structures of the present invention are preferably made or derived from a silicon substrate (e.g., a n- or p-type silicon wafer) using microelectromechanical systems (MEMS) technologies such as, for example, wet chemical etching, deep reactive ion etching (DRIE), and hydrofluoric acid (HF) anodic etching as known in the art and as herein disclosed. The electrode structures of the present invention may, however, be made from one or more other materials such as, for example, a porous carbon-based material, a porous ceramic material, a porous indium-phosphide material, and/or a sol-gel material (see, e.g., commonly owned PCT International Nos. WO 01/37357, WO 02/086994, WO 03/058734, and U.S. Patent Publication Nos. US2002/0182479, US2003/0194598 which publications are incorporated herein by reference in their entireties).

In several of the embodiments set forth herein, the electrode pair assemblies are based, in large part, on porous substrates and support structures that have catalyst particles dispersed (contiguously or noncontiguously) on selected pore surfaces via an optional interposing conductive layer. In these embodiments, the surfaced adhered catalyst material is generally readily accessible to liquid reactant flowstreams. Moreover, and in the context of some embodiments of the present invention, it has been discovered that silicon-based substrates and/or support structures are particularly useful as electrodes for fuel cell systems (especially for microfluidic direct methanol fuel cell systems), in part because such substrates and/or support structures are able to provide a high surface area to bulk volume ratio, have good mechanical strength, and are compatible with thin/thick films which are often needed for making selected electrical connections. Because of these physical characteristic, among others, and because silicon-based substrates and/or support structures are amenable to micro-fabrication techniques, the electrochemical and fuel cells of the present invention may be manufactured within a small form factor, but with sufficient power densities to power portable electronic devices.

Accordingly, and without limitation to any particular methodology, the silicon-based electrode structures disclosed herein may be manufactured by using standard microelectromechanical systems (MEMS) technologies such as, for example, wet chemical etching, deep reactive ion etching (DRIE), hydrofluoric acid (HF) anodic etching, alkaline etching, plasma etching, lithography, and electrodeposition. By using these techniques, a silicon substrate useful for carrying a catalyst may be produced, wherein the silicon substrate may have any number of pores and pores sizes such as, for example, random or ordered pore arrays, including pore arrays having selected pore diameters, depths, and distances relative to one another. In short, the present invention is inclusive of all silicon substrate support structures, including combinations thereof, that have any number of possible porosities and/or void spaces associated therewith.

Thus, and in some embodiments, the electrode structures of the present invention comprise a silicon substrate (with a thickness preferably ranging from about 300 to about 500 microns) having one or more discrete porous regions disposed across a top surface of the substrate. In addition, each of the one or more discrete porous regions is preferably defined by a plurality of acicular or columnar pores (i.e., passageways) that extend through the substrate (with average diameter ranging from about 0.5 to about 10 microns). The plurality of acicular or columnar pores define inner pore surfaces, and the inner pore surfaces may have an optional conformal electrically conductive layer thereon. In some embodiments, the pores are substantially perpendicular to the top and bottom surfaces of the substrate. In some other embodiments, the pores each have a diameter of about 5 microns and are spaced apart from one another about 8 microns (from pore center axis to adjacent pore center axis) so as to yield substrate having an approximate 39% porosity.

Porous silicon substrates (and/or support structures) useful as electrode structures may be formed by silicon micro-machining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching. This technique has been used in the semiconductor industry for wafer thinning, polishing, and the manufacture of thick porous silicon films. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.*, 11(12):588-589 (1990)). In the context of the present invention, it is to be understood that the porous silicon may be microporous silicon (i.e., average pore size <2 nm), mesoporous silicon (i.e., average pore size of 2 nm to 50 nm), or macroporous silicon (i.e., average pore size >50 nm). The pores are in many embodiments arranged as a series of parallelly aligned acicular or columnar pores that extend through the silicon substrate.

For example, porous silicon substrates useful in the context of the present invention may be formed by a photoelectrochemical HF anodic etching technique, wherein selected oxidation-dissolution of silicon occurs under a controlled current density. (See, e.g., Levy-Clement et al., "Porous n-silicon Produced by Photoelectrochemical Etching," *Applied Surface Science*, 65/66: 408-414 (1993); M. J. Eddowes, "Photoelectrochemical Etching of Three-Dimensional Structures in Silicon," *J. of Electrochem. Soc.*, 137(11):3514-3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes).

In view of the foregoing and with reference to FIG. 3, the present invention is also directed to a fuel cell system stack assembly 100, wherein a plurality of electrode pairs 112 are arranged in an anode-cathode/anode-cathode/anode-cathode/anode-cathode configuration, and wherein discrete anolyte flowstreams A supply each anode and discrete catholyte flowstreams C supply each cathode. In this embodiment, each electrode pair 112 is essentially the same as described above.

Figure 4:
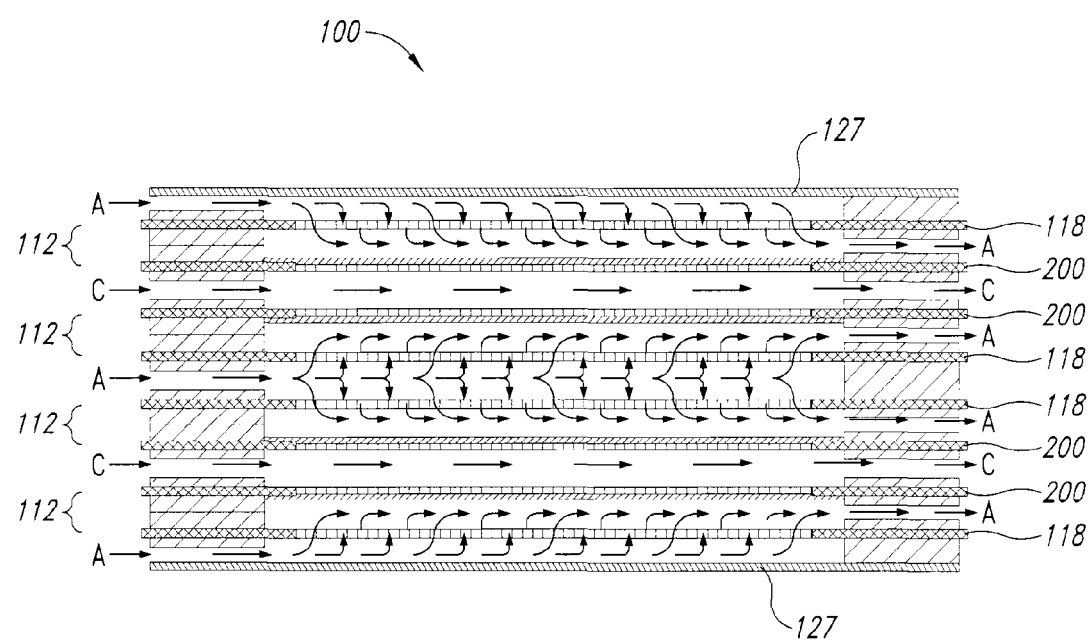
FIG. 4 depicts a side cross sectional view of a four cell stack assembly in accordance with an embodiment of the present invention, wherein the electrode pairs are arranged in an anode-cathode/cathode-anode/anode-cathode/cathode-anode configuration, and wherein a central anolyte flowstream supplies two of the inner anodes and discrete catholyte flowstreams supply two of the inner cathodes.

In view of the foregoing and with reference to FIG. 4, the present invention is also directed to a fuel cell system stack assembly 100, wherein a plurality of electrode pairs 112 are arranged in an anode-cathode/cathode-anode/anode-cathode/cathode-anode configuration, and wherein a central anolyte flowstream A supplies two of the inner anodes 118 and discrete catholyte flowstreams C supply two of the inner cathodes 120. In this embodiment, each electrode pair 112 is essentially the same as described above.

For purposes of illustration and not limitation, the following examples more specifically disclose exemplary manufacturing steps and actual experimental results associated with the fuel cell systems made and used in accordance with the present invention.

Example 1

Manufacturing Steps Used to Make Silicon-Based Anode Structures

Step 1. Wafer Spec: Si Wafers were provided by Wacker-Siltronic (Munich, Germany) wherein each wafer had an approximate 3000-3500 Å layer of Low Temperature Oxide (LTO) on the front side and with approximate specifications as set forth in the Table below.

TABLE 1

| SILICON WAFER SPECIFICATIONS | | | | | | | | | | |
|---|---|---|---|---|---|---|---|---|---|---|
| Diameter [mm] | Thickness [μm] | Crystal Orient [—] | Dopant Type [—] | Type [—] | ρ [Ω-cm] | TTV [μm] | Growth [—] | Dif Length [μm] | Grade [—] | Primary Fat [μm] |
| 100 | 550 | 100 | P | n | 20-30 | <5 | CZ | >400 | Hi-Ref | 30-35 |

Step 2. Wafer Cleaning: A single wafer was cleaned with Nanostrip, then in BOE, and then with a spin rinse dryer (SRD).

Step 3. Al Contact Doping: The wafer was doped by using a spin on dopant on the backside and inserting into a furnace.

Step 4. Photolithography: The front side of the wafer was then patterned with photoresist (namely, and ordered array of 5 μm squares with an 8 μm pitch).

Step 5. RIE: The patterned LTO was etched using an RIE (reactive ion etcher) exposing the bare silicon underneath.

Step 6. Barrel Etch: The wafer was cleaned in a Barrel Etch to remove residue from the RIE process.

Step 7. Photoresist Strip: The exposed photoresist was then removed using EKC830 and then AZ300T. The wafer was cleaned in a SRD.

Step 8. Metallization: An approximate 5000 Å aluminum film was then deposited on the backside of the wafer using PVD.
Step 9. Photolithography: The backside was patterned with photoresist.
Step 10. Al Etch: The unexposed aluminum was etched with Alameda Al etchant to expose the doped bare silicon.
Step 11. Photoresist Strip: The exposed photoresist was removed using EKC830 and then AZ300T. The wafer was then cleaned in a SRD.
Step 12. Metal Anneal: The aluminum was annealed.
Step 13. KOH: The wafer was placed in a fixture which exposed the front side only. The front side was then etched in KOH. The wafer was then cleaned in a SRD.
Step 14. Anodic Si Etching: The wafer was anodically etched in 4-6 wt % HF for 16-24 hours under a bias of 1.4 to 6V and a current density of 18-25 mA/cm$^2$ at 14-20° C.
Step 15. Wafer Cleaning: The wafer was cleaned in a SRD.
Step 16. Grinding: The backside of the wafer was anodically etched in 5 wt % HF for 11-12 hours under a bias of 0.8-1.5V (monotonic increase) and a current density of 5.5-4.1 mA/cm$^2$ at 20-16° C. (monotonic decrease).
Step 17. Wafer Cleaning: The wafer was then cleaned in a bath that consisted essentially of about 4 L of 5 wt % HF/10 mL of 60 wt % HNO$_3$/10 mL of 20 wt % Acetic Acid (400:1:1). The wafer was then cleaned in a SRD. The wafer was then sonicated in isopropanol.
Step 18. Barrel Etch: The wafer was cleaned in a Barrel Etch to remove residue from the earlier processes.
Step 19. Saturation Doping: The wafer was doped by using a spin on dopant on both sides followed by heating in a furnace. The wafer was then cleaned in a SRD. The wafer was then sonicated in isopropanol.
Step 20. Metallization: An approximate 5,000 Å gold film was selectively deposited around the porous silicon region on the both sides of the wafer using PVD.
Step 21. Metal Anneal: The gold was annealed by placing in a preheated furnace.
Step 22. Dice: The wafer was diced into two 3 cm×8 cm dies.
Step 23. Wafer Cleaning: The dies were cleaned in DI Water and EtOH.
Step 24. ALD Ru: The dies were first oxidized by exposure to water at about 500° C. to form a fresh oxide layer (the oxide layer provided a clean and homogeneous surface for subsequent atomic layer deposition (ALD) of a Ruthenium film). Bis(cyclopentadienyl)ruthenium maintained at about 60° C. and O$_2$ gas were used as precursors for Ruthenium deposition. N$_2$ was used as both the precursor carrier and the purge gas. In order to enhance access of reactants to the pores, each porous support structure was situated perpendicular to the flow of reactants in the reaction chamber. Each cycle consisted essentially of alternating pulses of Bis(cyclopentadienyl)ruthenium and O$_2$ gas. 900 cycles were run to deposit a conformal film of approximately 100 nm of Ruthenium (having a measured sheet resistance with a 4 point probe of about 80 mΩ·squares±20 mΩ·squares).
Step 25. Catalyst Electro-deposition: Catalyst Electroplating
  a. A die was placed in a flow-through chamber and filled with a solution of 12 mM H$_2$PtCl$_6$.XH$_2$O, 15 mM RuCl$_3$.XH$_2$O, 25% ethanol, and 1M sulfuric acid.
  b. The solution was forced through the porous silicon die with an approximate flux of 231.5 µL/min/cm$^2$.
  c. Catalyst was deposited potentiostatically at about 500 Coulombs at −155 mV.
Step 26. Wafer Cleaning: The die was cleaned in DI Water and EtOH.

Example 2

Manufacturing Steps Used to Make Silicon-Based Cathode Structures

Steps 1-24 are the same as steps 1-24 set forth above in Example 1.
Step 25. Catalyst Deposition: A catalyst ink was prepared by homogenizing about 250 mg of Pt:Ru black and about 1,250 mg of 5% Nafion solution in a mixture of solvents in a sonicator. Then appropriate amounts of the ink were applied to the surface of the die to yield a catalyst loading of about 30 mg/cm$^2$.
Step 26. Sinter: The coated die was then sintered.

Example 3

Manufacturing Steps Used to Make Alternative Cathode Structures

Steps 1-19 are the same as steps 1-19 set forth above in Example 1.
Step 20. Metallization: An approximate 5000 Å gold film was deposited on the both sides of the wafer using PVD.
Step 21. Metal Anneal: The gold was annealed by placing in a preheated furnace.
Step 22. Dice: The wafer was diced into two 3 cm×8 cm dies.
Step 23. Wafer Cleaning: The dies were cleaned in DI Water and EtOH.
Step 24. Catalyst deposition: A solution of about 250 mg Pt black, 50 mg PTFE (Teflon), and 25 mL Acetone was homogenized for 0.5-1 min in a sonicator. Each silicon die was wetted with Acetone. Then about 2 mL of the solution was evenly distribute over the surface of the coupon. Then the surface of the die was washed with DI H$_2$O. The desired content was about 5:1 of Pt black to PTFE.
Step 25. PVDF Film: A PVDF (poly vinylidene fluoride) membrane (hydrophilic membrane) was placed on top of the catalyst layer. The die with the PVDF membrane was pressed under about 100 lbs for about 10 seconds, then released. This step was then repeated for a second time. The PVDF membrane was then removed.
Step 26. Heat: A glass slide was placed on top of the catalyst layer to prevent cracking. Then the die with the glass slide was placed in an oven and heated. Then the glass slide was removed.

Example 4

Manufacturing Steps Used to Make Alternative Cathode Structures

Steps 1-19 are the same as steps 1-19 set forth above in Example 1.
Step 20. Metallization: An approximate 5000 Å gold film was deposited on the both sides of the wafer using PVD.
Step 21. Metal Anneal: The gold was annealed by placing in a preheated furnace.
Step 22. Dice: The wafer was diced into two 3 cm×8 cm dies.
Step 23. Wafer Cleaning: The dies were cleaned in DI Water and EtOH.
Step 24. ALD Ru: The dies were first oxidized by exposure to water at about 500° C. to form a fresh oxide layer (the oxide layer provided a clean and homogeneous surface for subsequent atomic layer deposition (ALD) of a Ruthenium film). Bis(cyclopentadienyl)ruthenium maintained at about 60° C. and $O_2$ gas were used as precursors for Ruthenium deposition. $N_2$ was used as both the precursor carrier and the purge gas. In order to enhance access of reactants to the pores, each porous support structure was situated perpendicular to the flow of reactants in the reaction chamber. Each cycle consisted essentially of alternating pulses of Bis(cyclopentadienyl)ruthenium and $O_2$ gas. The pulse duration of both the Ruthenium precursor and $O_2$ gas was about 6 seconds and the purge duration was about 9 seconds. 900 cycles were run to deposit approximately 100 nm of Ruthenium.

Step 25. Catalyst deposition: A catalyst ink was prepared by homogenizing about 250 mg of Pt:Ru black and about 1,250 mg of 5% Nafion solution in a mixture of solvents in a sonicator. Then appropriate amounts of the ink were applied to the surface of the coupon to yield a catalyst loading of about 30 mg/cm$^2$.

Step 26. Sinter: The coated coupon was sintered.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A fuel cell system that includes an electrode pair assembly, not having an interposing solid polymer proton exchange membrane, configured to receive and react with a liquid anolyte flowstream and a liquid catholyte flowstream, comprising:
    a porous flow-through anode;
    a porous flow-by cathode confronting and spaced apart from the anode; and
    a central plenum interposing between the anode and the cathode,
    wherein the anolyte flowstream is configured to flowingly contact and substantially pass through the anode and into or out of the central plenum, and
    wherein the catholyte flowstream is configured to flowingly contact and pass adjacent to the cathode such that a nonflowing portion of the catholyte flowstream reacts at the cathode but does not substantially pass through the cathode and into the central plenum,
    wherein the porous flow-through anode comprises a plurality of linear anode pores extending therethrough, and wherein the anolyte flowstream is configured to flowingly contact and substantially pass through the anode by way of the plurality of anode pores, and
    wherein the porous flow-by cathode comprises a plurality of linear cathode pores extending substantially therethrough, wherein a catalyzed separation layer is connected to the cathode so as to plug a volume portion of the plurality of cathode pores, and wherein the nonflowing portion of the catholyte flowstream resides within the cathode pores.

2. The fuel cell system of claim 1 wherein the plurality of linear anode pores are equally spaced apart from one another.

3. The fuel cell system of claim 1 wherein the plurality of linear cathode pores are equally spaced apart from one another.

4. The fuel cell system of claim 1, further comprising a microfluidic anolyte flow channel positioned adjacent to the anode for transporting the anolyte flowstream to the anode.

5. The fuel cell system of claim 4 wherein the anolyte flowstream is flowing laminarly within the microfluidic anolyte flow channel.

6. The fuel cell system of claim 4 wherein the anolyte flowstream contains methanol for reacting at the anode.

7. The fuel cell system of claim 6 wherein the anolyte flowstream has a flow rate ranging from about 0.3 ml/min to about 1.8 ml/min.

8. The fuel cell system of claim 1, further comprising a microfluidic catholyte flow channel positioned adjacent to the cathode for transporting the catholyte flowstream to the cathode.

9. The fuel cell system of claim 8 wherein the catholyte flowstream is flowing laminarly within the microfluidic catholyte flow channel.

10. The fuel cell system of claim 9 wherein the catholyte flowstream contains nitric acid for reacting at the cathode.

11. The fuel cell system of claim 10 wherein the catholyte flowstream has a flow rate ranging from about 0.3 ml/min to about 1.8 ml/min.

12. The fuel cell system of claim 1 wherein the anode comprises a plurality of regularly spaced apart microcolumnar flow-through anode pores that extend through the anode.

13. The fuel cell system of claim 12 wherein the plurality of regularly spaced apart microcolumnar flow-through anode pores are uniformly spaced apart from one another a distance ranging from about 3 μm to about 20 μm.

14. The fuel cell system of claim 12 wherein the anode is made from a silicon substrate.

15. The fuel cell system of claim 14 wherein the silicon substrate has a uniform thickness ranging from about 100 μm to about 500 μm.

16. The fuel cell system of claim 15 wherein each of the plurality of regularly spaced apart microcolumnar flow-through anode pores has a diameter ranging from about 1 μm to about 25 μm.

17. The fuel cell system of claim 16 wherein the plurality of regularly spaced apart microcolumnar flow-through anode pores have aspect ratios of greater than about 10:1.

18. The fuel cell system of claim 17 wherein the plurality of regularly spaced apart microcolumnar flow-through anode pores have an anode pore walls, with each anode pore wall having a first electrically conductive film layer thereon.

19. The fuel cell system of claim 18 wherein the first electrically conductive layer consists essentially of gold or one or more platinum group metals.

20. The fuel cell system of claim 19 wherein the first electrically conductive layer has a thickness ranging from about 50 Å to about 2,500 Å.

21. The fuel cell system of claim 17 wherein the first electrically conductive film layer has a plurality of first catalyst particles dispersed thereon.

22. The fuel cell system of claim 21 wherein the plurality of first catalyst particles comprises platinum and ruthenium.

23. The fuel cell system of claim 1 wherein the cathode comprises a plurality of regularly spaced apart microcolumnar flow-through cathode pores that extend through the cathode.

24. The fuel cell system of claim 23 wherein the plurality of regularly spaced apart microcolumnar flow-through cathode pores are uniformly spaced apart from one another a distance ranging from about 3 μm to about 20 μm.

25. The fuel cell system of claim 23 wherein the cathode is made from a silicon substrate.

26. The fuel cell system of claim 25 wherein the silicon substrate has a uniform thickness ranging from about 100 µm to about 500 µm.

27. The fuel cell system of claim 26 wherein each of the plurality of regularly spaced apart microcolumnar flow-through cathode pores has a diameter ranging from about 1 micron to about 25 microns.

28. The fuel cell system of claim 27 wherein the plurality of regularly spaced apart microcolumnar flow-through cathode pores have aspect ratios of greater than about 10:1.

29. The fuel cell system of claim 28 wherein the plurality of regularly spaced apart microcolumnar flow-through cathode pores have a cathode pore walls, with each cathode pore wall having a second electrically conductive film layer thereon.

30. The fuel cell system of claim 29 wherein the second electrically conductive layer consists essentially of gold or one or more platinum group metals.

31. The fuel cell system of claim 30 wherein the second electrically conductive layer has a thickness ranging from about 50 Å to about 2,500 Å.

32. The fuel cell system of claim 31 wherein the second electrically conductive film layer has a plurality of second catalyst particles dispersed thereon.

33. The fuel cell system of claim 32 wherein the plurality of second catalyst particles comprises platinum and ruthenium.

34. The fuel cell system of claim 1, further comprising:
(i) a microfluidic anolyte flow channel positioned adjacent to the anode for transporting the anolyte flowstream to the anode, wherein the anolyte flowstream is flowing laminarly within the microfluidic anolyte flow channel, and wherein the anolyte flowstream contains methanol for reacting at the anode; and
(ii) a microfluidic catholyte flow channel positioned adjacent to the cathode for transporting the catholyte flowstream to the cathode, wherein the catholyte flowstream is flowing laminarly within the microfluidic catholyte flow channel, and wherein the catholyte flowstream contains nitric acid for reacting at the cathode.

* * * * *